(12) United States Patent
Bühler et al.

(10) Patent No.: US 10,018,500 B2
(45) Date of Patent: Jul. 10, 2018

(54) BALANCE WITH ACTIVE HEAT FLOW CONTROL

(71) Applicant: Mettler-Toledo GmbH, Greifensee (CH)

(72) Inventors: Stefan Bühler, Nänikon (CH); Daniel Mock, Oberengstringen (CH); Michael Geiser, Zürich (CH)

(73) Assignee: METTLER-TOLEDO GMBH, Greifensee (CH)

( * ) Notice: Subject to any disclaimer, the term of this patent is extended or adjusted under 35 U.S.C. 154(b) by 165 days.

(21) Appl. No.: 15/288,373

(22) Filed: Oct. 7, 2016

(65) Prior Publication Data

US 2017/0122797 A1    May 4, 2017

(30) Foreign Application Priority Data

Oct. 29, 2015   (EP) ..................... 15192034

(51) Int. Cl.
*G01G 21/28* (2006.01)
*G01G 23/48* (2006.01)
(Continued)

(52) U.S. Cl.
CPC ............ *G01G 23/48* (2013.01); *F25B 21/02* (2013.01); *G01G 21/22* (2013.01); *G01G 21/286* (2013.01);
(Continued)

(58) Field of Classification Search
CPC ...... G01G 21/22; G01G 21/286; G01G 23/48; F25B 21/02; F25B 2313/0212;
(Continued)

(56) References Cited

U.S. PATENT DOCUMENTS 4,666,005 A * 5/1987 Komoto ............... G01G 21/286
177/180
6,173,619 B1 * 1/2001 Satake ..................... G01G 3/18
73/862.622
(Continued)

FOREIGN PATENT DOCUMENTS

DE          20022679 U1    2/2002
DE       102008056514 A1   5/2010
DE       102009055622 A1   5/2011

*Primary Examiner* — Randy Gibson
(74) *Attorney, Agent, or Firm* — Standley Law Group LLP

(57) ABSTRACT

A balance (30) is a single unit with a weighing pan (21) enclosed in a weighing compartment (22). A housing (23) adjoins the weighing compartment. The balance housing contains a weighing cell compartment (24) enclosing a weighing cell, an electronics compartment (25) containing electrical and electronic circuit elements, a thermoelectric heat pump module (27) and a heat flow controller (28). The balance is equipped to determine a net heat flow ($P_{net}$) inside the housing in the direction from the weighing cell compartment to the electronics compartment. The heat flow controller uses the net heat flow as a control input to regulate the the thermoelectric heat pump module, arranged inside the housing. The control input is used to generate an active heat flow ($P_A$) with magnitude and direction for holding the net heat flow at a level equal to the rate of heat dissipation produced inside the weighing cell compartment.

10 Claims, 5 Drawing Sheets

(51) Int. Cl.
  *F25B 21/02* (2006.01)
  *G01G 21/22* (2006.01)
(52) U.S. Cl.
  CPC . *F25B 2321/023* (2013.01); *F25B 2321/0212* (2013.01); *F25B 2500/19* (2013.01); *F25B 2700/2107* (2013.01)
(58) Field of Classification Search
  CPC ............ F25B 2313/023; F25B 2500/19; F25B 2700/2107
  See application file for complete search history.

(56) References Cited

U.S. PATENT DOCUMENTS

| | | | |
|---|---|---|---|
| 6,951,989 B2 | 10/2005 | Nufer et al. | |
| 7,145,086 B2 * | 12/2006 | Iiduka et al. | ........ G01G 21/286 177/180 |
| 8,294,045 B2 * | 10/2012 | Luchinger | ............ G01G 21/286 177/180 |

* cited by examiner

FIG. 1 (STATE OF THE ART)

BALANCE WITH ACTIVE HEAT FLOW CONTROL

CROSS-REFERENCE TO RELATED APPLICATIONS

This application is entitled to benefit of a right of priority from European Patent Application No. 15192034.5, filed on 29 Oct. 2015. The content of that application is incorporated by reference as if fully recited herein.

TECHNICAL FIELD

The invention concerns an analytical balance of the kind that is typically used in research, production and testing laboratories. When a weight is displayed in grams, there is a terminology associated with the number of digits that are displayed to the right of the decimal point. That terminology is used here. In a "macro-analytical" balance, four decimal digits are displayed (d=0.0001 g, "d" being the digital increment of the weight display). In a "semi-microanalytical" balance, five decimal digits are displayed (d=0.00001 g). In a "microanalytical" balance, six decimal digits are displayed (d=0.000001 g) and, in an "ultra-microanalytical" balance, seven decimal digits are displayed.

BACKGROUND

In a typical configuration, an analytical balance presents itself as a unit which can be set up for operation on a work table, with a weighing pan inside an enclosed, transparent weighing compartment, a display panel and control elements in front, i.e. facing a human operator, and with a housing enclosure adjoining a rear side of the weighing compartment and containing mechanical, electrical and electronic operating parts of the balance.

In balances with five and more decimal digits displayed, the air temperature inside the weighing compartment is a critical factor, particularly in micro- and ultra-microbalances. If the temperature inside the weighing compartment is different from the ambient atmosphere, opening a weighing compartment door will give rise to strong air currents due to the temperature gradient between the inside and the outside. As it takes considerable time for the turbulence to settle, the weighing process will be slowed down by a long transient period before a stable result is displayed, and reproducibility will be negatively affected. After the door of the weighing compartment has been closed, air that has moved into the weighing compartment from the ambient atmosphere is heated up due to power dissipation of the electrical and electronic elements of the balance. As a result of the temperature rise, the air density (and consequently the air buoyancy effect on an object being weighed) will change over time, so that the indicated weighing result may drift (i.e. slowly change) over several minutes.

Furthermore, the problems caused by power dissipation of the electrical and electronic elements of balances increase with the growing demand for power-consuming features in balances, such as graphic user interfaces, network connections and connectivity to peripheral equipment.

According to a state-of-the-art solution which is used in micro- and ultra-microbalances manufactured by the assignee of the present invention, the temperature-sensitive parts of the balance are separated from the power-dissipating parts by incorporating them in different modular units that are tied to each other by cables and/or plug connectors. A first unit, the weighing module, includes the weighing compartment with the weighing pan and—directly adjoining and forming the rear wall of the weighing compartment—a first enclosure containing the weighing cell and only a required minimum of electronic components. A second unit, the electronic module, is housed in a second enclosure and essentially includes the analog and digital electronics and associated power supply circuits to support the weighing module. A third unit, the display module or user interface module, occupies a third enclosure and includes a touch screen display with associated electronics and power supply circuitry. This modular system provides a satisfactory solution to the aforementioned problem of temperature-induced air flows affecting the speed and accuracy of the weighing operation. However, it is inherently more expensive and more space-consuming than a balance that is configured as a single unit.

According to another solution developed by the assignee of the present invention and disclosed in U.S. Pat. No. 6,951,989, a balance which is configured as a single unit, with a weighing compartment and with a directly adjoining enclosure containing the weighing cell and electronics of the balance, includes a thermoelectric heat pump module, for example a Peltier element, which is arranged on the balance at a location outside of the weighing compartment. The cooling side of the thermoelectric heat pump module is thermally connected to the bottom of a heat-conductive vertical separating wall between the weighing compartment and the weighing cell compartment. Thus, with an appropriately selected, factory-set power level of the thermoelectric heat pump module, the interior of the weighing compartment can be held at a temperature level close to ambient, while a temperature gradient establishes itself wherein the temperature increases from the bottom to the top of the rear wall. This has the effect that the air temperature inside the weighing compartment likewise increases from the bottom to the top, which promotes a stable thermal stratification or layering of the air in the weighing compartment. Due to the resulting absence of convective air currents acting on the weighing pan, the indicated weighing result remains stable. This solution addresses the problem of air currents inside the weighing compartment, but it does not adequately mitigate the thermal influence on the weighing cell from the electronics and power supply which share the same enclosure with the weighing cell.

In another analytical balance of single-unit configuration, which is described in DE 10 2009 055 622 A1, the weighing compartment with the weighing pan sits on top of an enclosed base containing the weighing cell and electronics. A first heat-conducting plate which forms a floor of the weighing compartment is connected to the cooling side of a thermoelectric heat pump module, while the heating side of the thermoelectric heat pump module is connected by way of a heat pipe to a second heat-conducting plate forming a ceiling of the weighing compartment. It is proposed to regulate the power of the thermoelectric heat pump module by way of a feedback control circuit with a first and a second temperature sensor arranged respectively, near the top and the bottom of the interior of the weighing compartment, and wherein the average of the signals of the first and the second temperature sensor is used as the feedback quantity. In a further developed embodiment, a third temperature sensor is added outside the weighing compartment, i.e. exposed to the ambient atmosphere, and the power of the thermoelectric heat pump module is regulated dependent on the aforementioned average signal of the first and the second temperature sensor and additionally dependent on the signal of the third temperature sensor.

In the foregoing examples of state-of-the-art solutions to prevent convective air currents in the weighing compartment of an analytical balance which occur as a result of the heat generated by the electronics, one will recognize a progression from:

a) an entirely passive solution that relies on housing the power-dissipating parts of the balance in spatially separated modular units, to b) an active, open-loop solution using a thermoelectric heat pump module that operates without feedback control, to c) an active, closed-loop solution using a thermoelectric heat pump module whose power is regulated by feedback control based on one or more actual temperatures that are measured by temperature sensors.

It is therefore the objective of the present invention to provide a balance, specifically an analytical balance having a resolution of $10^{-5}$ to $10^{-7}$ grams, with active, feedback-regulated control means to prevent heat that originates from the electronics and power supply circuits of the balance from entering into the weighing cell and the weighing compartment.

SUMMARY OF THE INVENTION

As mentioned above the passive solution of housing the power-dissipating parts of the balance in spatially separated modular units proved satisfactory in preventing the heat dissipated by the electronics from affecting the speed and accuracy of the weighing operation, but the higher cost of the modular system and the larger work surface area taken up by the separate modular units are seen as a drawback in comparison to a single-unit configuration. The applicants therefore aimed for a solution where essentially the weighing module and the electronics module of the modular system are joined in a single-unit analytical balance which includes the weighing compartment with the weighing pan, the weighing cell, as well as all analog and digital electronics and associated power supply circuits of the balance.

As a first approach, a solution was studied wherein the previously separate weighing module (weighing compartment and weighing cell) and electronics module (analog and digital electronics and associated power supply circuits) were assembled into one body with a passive insulation barrier arranged between them. Based on the difference in the respective operating temperatures measured inside the weighing module and the electronics module, it was calculated that a polyurethane insulation barrier of 80 mm thickness would be required in order to reduce the heat flow from the electronics module to the weighing module to a permissible 0.05 watt. This would have increased the dimensions of the product to an extent that was deemed unacceptable.

Consequently, the idea of reducing the heat flow by means of a passive insulation barrier was abandoned in favor of a concept of regulating the heat flow by active compensating means in the form of at least one thermoelectric heat pump module, specifically a Peltier module, controlled by closed-loop feedback from a heat-flow measuring arrangement.

It is important to note that from the outset the efforts were focused on an approach in which a heat-flow based feedback signal is used to control a heat flow that is caused by the heat-generating electronics and the thermoelectric heat pump module within a single-unit analytical balance, as opposed to the state-of-the-art concept of controlling a temperature and using temperature-based feedback signals as proposed in DE 10 2009 055 622 A1.

According to the invention, the stated objective is met by a balance with the features of the accompanying claims which also include further developed embodiments and details of the invention.

A balance in accordance with the present invention is configured as a single unit with a weighing pan enclosed in a weighing compartment and with a balance housing adjoining the weighing compartment, wherein the balance housing contains a weighing cell compartment containing a weighing cell, an electronics compartment containing electrical and electronic circuit elements, a thermoelectric heat pump module, and a heat flow controller. According to the invention, the balance includes a means to determine a net heat flow $P_{net}$ inside the balance housing in the direction from the weighing cell compartment to the electronics compartment as a control input signal for the heat flow controller. Further according to the invention, the thermoelectric heat pump module is arranged inside the balance housing and is regulated by the heat flow controller based on said control input signal to generate an active heat flow $P_A$ of a magnitude and direction to hold the net heat flow $P_{net}$ at a level that essentially equals the rate of heat dissipation produced inside the weighing cell compartment.

Accordingly, the heat dissipation produced by the elements in the weighing cell compartment has to be known and sufficiently constant, or its magnitude needs to be calculated or measured and sent as an additional input to the heat flow controller.

In preferred embodiments of the invention, the thermoelectric heat pump module is a Peltier module with a first side or cooling side and a second side or heating side. When the Peltier module is operating as a heat pump, the heat flow controller sends an electric current through the Peltier module, causing the latter to remove heat from the first side and to generate heat on the second side and to thereby establish the active heat flow $P_A$ from the first side to the second side. As a preferred interior arrangement, the balance housing contains, sequentially in the direction from the weighing cell compartment towards the electronics compartment, a first interior wall, an interstitial space, and a second interior wall, wherein the Peltier module is arranged in the interstitial space with its first side thermally connected to the first interior wall and its second side thermally connected to the second interior wall, wherein the remaining interstitial space surrounding the Peltier module is filled with an insulating material, and wherein the net heat flow $P_{net}$ inside the balance housing in the direction from the weighing cell compartment towards the electronics compartment equals the difference of the active heat flow $P_A$ minus a passive heat flow $P_I$ through the insulating material in the reverse direction of the active heat flow $P_A$, i.e. $P_{net}=P_A-P_I$.

In a preferred embodiment of the invention, the Peltier module, in addition to serving as the heat pump, also serves as the means to determine the net heat flow $P_{net}$. In this embodiment, the Peltier module is alternatingly switchable between the heat-pumping mode and a thermoelectric generator mode. In the thermoelectric generator mode, if a temperature difference $\Delta T_I$ exists between the first side and the second side of the Peltier module, the latter can send to the heat flow controller an electrical signal corresponding to the temperature difference $\Delta T_I$. Based on the electrical signal representing $\Delta T_I$ received while the Peltier module is working in the generator mode, the heat flow controller calculates the net heat flow $P_{net}$, as will be explained in more detail in the description of FIG. 3. After the Peltier module is switched back to heat-pumping mode the heat flow controller, based on the calculated value of $P_{net}$, regulates the power supplied to the Peltier module as described above, to generate the active heat flow $P_A$ of the required magnitude.

In another, likewise preferred embodiment, where the Peltier module operates only as a heat pump, the balance housing between the weighing cell compartment and the first interior wall further contains a third interior wall adjoining the weighing cell compartment and a boundary layer of insulating material of a thermal resistance ($R_{th}$) arranged between the third interior wall and the first interior wall. The means to determine the net heat flow $P_{net}$ includes a pair of temperature sensors which are placed, respectively, at the third interior wall and at the first interior wall. Based on at least one temperature signal generated by the pair of temperature sensors, the heat flow controller calculates the heat flow $P_{net}$ through the boundary layer.

In a preferred embodiment of the invention, the pair of temperature sensors includes a first temperature sensor to measure a first temperature $T_1$ of the third interior wall and a second temperature sensor to measure a second temperature $T_2$ of the first interior wall. Based on respective temperature signals $T_1$, $T_2$ sent by the first and second temperature sensors, the heat flow controller calculates the heat flow $P_{net}$ through the boundary layer according to the equation $$P_{net} = \frac{T_1 - T_2}{R_{th}}.$$

In an alternative and likewise preferred embodiment, the pair of temperature sensors includes a pair of anti-serially connected thermocouples, whose junctions are placed, respectively, on the third interior wall and on the first interior wall. This thermocouple pair can directly measure a temperature difference $\Delta T = T_1 - T_2$ between a first temperature of the third interior wall and a second temperature $T_2$ of the first interior wall and send a temperature difference signal $\Delta T$ to the heat flow controller, based on which the heat flow controller calculates the heat flow $P_{net}$ through the boundary layer according to the equation $$P_{net} = \frac{\Delta T}{R_{th}}.$$

In principle any kind of commercially available heat flow sensor could be used to measure the heat flow through the boundary layer, without limitation in regard to any particular technology. For example, a second Peltier module could be used as a heat flow sensor, where the second Peltier module would operate as a thermoelectric generator whose output signal would be used as heat flow signal.

In another preferred embodiment, the electronics compartment is divided into a weighing electronics chamber containing temperature-sensitive, primarily analog electronic circuits and a digital electronics chamber containing primarily digital circuits and other power-dissipating elements that are much less temperature sensitive. In comparison to the first of the embodiments described above, the balance housing contains the following additional elements, adjoining each other sequentially from the weighing cell compartment towards the electronics compartment: a third interior wall adjoining the weighing cell compartment, a boundary layer of insulating material of a thermal resistance $R_{th}$, a fourth interior wall, and the weighing electronics chamber between the fourth interior interior wall and the first interior wall. The means to determine the net heat flow $P_{net}$ includes a pair of temperature sensors which are placed, respectively, on the third interior wall and on the fourth interior wall. Based on at least one temperature signal sent from the pair of temperature sensors to the heat flow controller, the latter calculates the heat flow through the boundary layer, analogous to the preceding embodiments.

In the arrangement of the preceding embodiment, the circuit elements enclosed in the weighing electronics chamber include for example the A/D converter and its voltage reference, which are temperature-sensitive but produce a relatively small amount of heat. The circuit elements assigned to the digital electronics chamber are insensitive to temperature changes within a specified operating range, but their heat dissipation can fluctuate and is an order of magnitude larger than the heat dissipation of the weighing electronics. With the foregoing embodiment, the temperature-sensitive weighing electronics are kept apart from the temperature fluctuations of the digital electronics.

Further in the preceding embodiment, the thermoelectric heat pump module is given the additional task of removing the heat produced inside the weighing electronics chamber in addition to the heat produced inside the weighing cell compartment. The cooling power of the thermoelectric heat pump module therefore needs to be increased accordingly.

In further developed embodiments of the balance according to the invention, additional electronic elements dissipating additional heat may be incorporated in or attached to the weighing cell compartment, such as for example a display panel or an inclinometer (electronic out-of-level sensing device). The rate of heat dissipation from these additional electronic elements can be variable or intermittent, and its magnitude needs to be calculated or measured and sent as an additional input to the heat flow controller in order to regulate the net heat flow $P_{net}$ as required to remove the increased amount of heat due to the additional electronic elements.

In all embodiments of the invention, it is beneficial if the balance housing has an exterior wall portion with cooling fins that are exposed to an ambient atmosphere of the balance. With particular advantage, the cooling fins are arranged on the part of the exterior wall that encloses the electronics compartment.

BRIEF DESCRIPTION OF THE DRAWINGS

The balance according to the invention will be described hereinafter through embodiments shown schematically in the drawings, wherein.

DETAILED DESCRIPTION OF THE DRAWINGS

Figure 1:
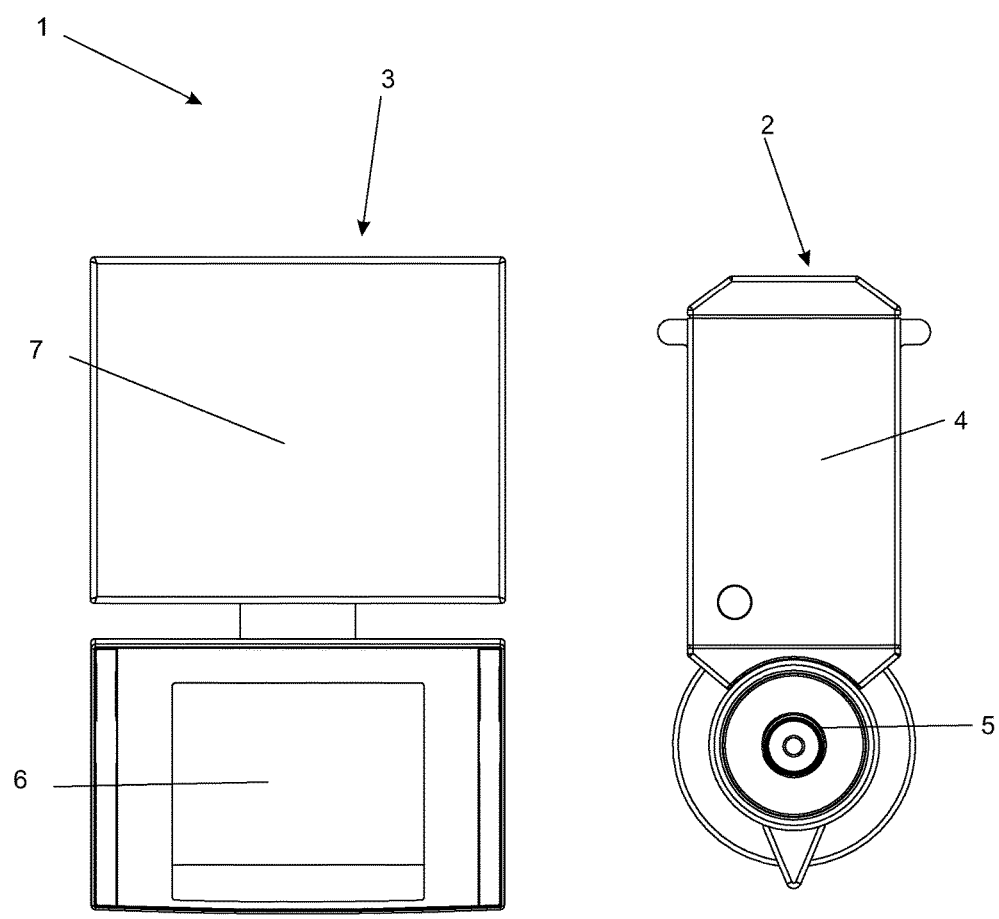
FIG. 1 shows a modular balance according to the state of the art.

FIG. 1 shows a state-of-the-art balance 1 which is manufactured by the assignee of the present invention. The temperature-sensitive parts of the balance 1, i.e. the weighing compartment 5 and adjoining weighing cell compartment 4 are joined together in a weighing module 2. The analog and digital electronics as well as electrical parts that produce most of the power dissipation are joined together in a separate modular unit 3, commonly referred to as weighing terminal, which includes in this case the touch screen display 6 and the electronics module 7. As mentioned previously, the modular layout of the state-of-the-art balance 1 provides a satisfactory solution to mitigating the thermal problems caused in an analytical balance by the power-dissipating electronics and electrical parts, but the modular configuration is inherently more expensive and more space-consuming than a balance that is configured as a single unit.

Figure 2:
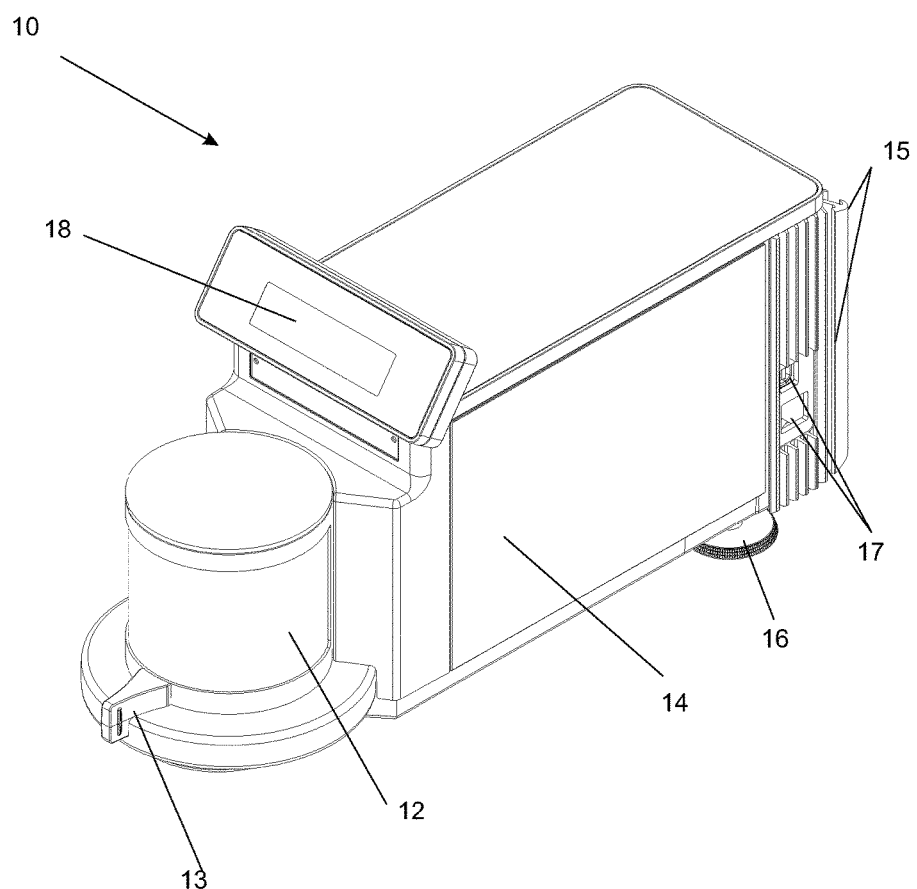
FIG. 2 shows a balance according to the invention seen from the front.

Therefore, the task presented itself to combine the weighing module 2 and the electronics module 7 of the prior-art balance 1 in a single unit as represented by the balance 10 in FIG. 2, which shows a perspective frontal view of the balance 10 according to the invention as it presents itself to a user, with the cylindrical weighing compartment 12 and the door handle 13 in front, adjoined by the balance housing 14 with cooling fins 15, adjustable leveling feet 16, and power—as well as interface connector sockets 17 at the rear. The parts which in the prior-art balance 1 were assigned to the weighing cell compartment 5 and the electronics module 7 are now enclosed in the balance housing 14. An optional, auxiliary weight display 18 is mounted on the balance housing directly above the weighing compartment 12. The main user interface of the balance 10, analogous to the touch screen display 6 of the prior-art balance 1, is still configured as a separate module (not shown in FIG. 2). The rationale for keeping the main user interface a separate module is to protect the balance 10 from thermal and mechanical disturbances which could be caused by the hands of an operator when pressing the keys on a touch screen or other input device if the latter were integrally incorporated in the balance 10.

Figure 3:
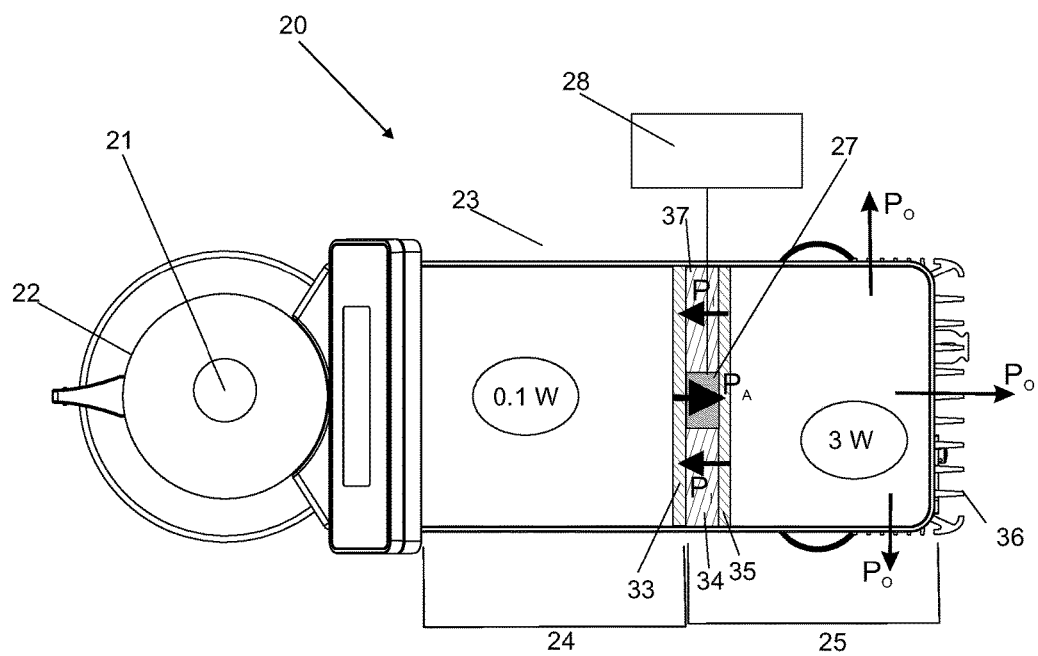
FIG. 3 represents a first embodiment of the invention with active heat flow control between the weighing cell compartment and the electronics compartment.

FIG. 3 illustrates a first embodiment of a balance 20 according to the invention in the single-unit configuration of the balance 10 of FIG. 2, with a weighing pan 21 enclosed in a weighing compartment 22 and with a balance housing 23 adjoining the weighing compartment 22, wherein the balance housing 23 encloses a weighing cell compartment 24 containing a weighing cell (not shown in the drawing), an electronics compartment 25 containing electrical and electronic circuit elements (not shown), a thermoelectric heat pump module 27, typically a Peltier module 27, and a heat flow controller 28. The Peltier module 27 is sandwiched between a first interior wall 33 and a second interior wall 35, and the interstitial space 34 surrounding the Peltier module 27 is filled with an insulating material 37. The interior walls 33 and 35 are made of a heat-conducting material, so that the first interior wall 33 has an essentially uniform first temperature, and the second interior wall 35 has an essentially uniform second temperature.

FIG. 3 further illustrates the heat sources and heat flows in the balance 20. As mentioned previously, the weighing cell of an analytical balance is very sensitive to temperature, and the generation of heat in the weighing cell compartment 24 is therefore kept to a minimum, typically of the order of 0.1 W as indicated graphically in the drawing. In contrast, the heat generation in the electronics compartment in balances according to the invention is typically of the order of 3 W. As a result of the larger heat dissipation and therefore higher temperature in the electronics compartment 25, a passive heat flow $P_I$ occurs from the interior wall 35 through the insulating material 37 to the interior wall 33. The Peltier module 27, on the other hand, removes heat from the interior wall 33 and generates heat on the side of the interior wall 35, thus producing an active heat flow $P_A$ in the opposite direction of the passive heat flow $P_I$. The difference $P_A-P_I=P_{net}$ represents the net heat flow in the direction from the weighing cell compartment 24 to the electronics compartment 25. Finally, the arrows $P_O$ represent the heat flow from the electronics compartment 25 to the outside by way of the cooling fins 36.

In the embodiment of FIG. 3, the Peltier module 27 is alternatingly switchable between two operating modes. In a first operating mode, the Peltier module works as the heat-pumping module that generates the active heat flow $P_A$ as described above. In a second operating mode, the Peltier module works as a sensor for a temperature difference between the first side and the second side of the Peltier module. If a temperature difference $\Delta T_I$ exists between the first side and the second side of the Peltier module, the latter generates an electrical signal in the form of a voltage representative of the temperature difference $\Delta T_I$ and sends it to the heat flow controller 28.

The generation of an electrical signal in the form of a voltage in response to a temperature difference $\Delta T_I$ is referred to as Seebeck effect. From the measured voltage $U_{Seebeck}$ the temperature difference can be calculated as $$\Delta T_I = k_2 \times U_{Seebeck},$$

wherein the factor $k_2$ depends mainly on properties of the Peltier module that can be determined in the product development of the balance.

Next, based on the temperature difference $\Delta T_I$, the heat flow $P_I$ through the insulating material 37 can be calculated as $$P_I = k_1 \times \Delta T_I,$$

wherein the factor $k_1$ depends on the dimensions and properties of the insulating material 37 and can be determined experimentally in the product development of the balance. Finally, the heat flow $P_{net}$ is determined as the difference of the heat flow $P_A$ that occurred previously in the heat-pumping mode of the Peltier module minus the heat flow $P_I$ determined from the temperature difference $\Delta T_I$ through the last equation above, i.e.

$$P_{net} = P_A - P_I.$$

Based on the net heat flow $P_{net}$, the heat flow controller 28 determines the active heat flow $P_A$ to be generated by the Peltier module 27 after it will have been switched back into heat-pumping mode. The Peltier module 27 is regulated by the heat flow controller 28 to generate an active heat flow $P_A$ of a magnitude and direction to keep the net heat flow $P_{net}$ at a controlled level that is necessary to remove the heat produced inside the weighing cell compartment 24.

If additional power-dissipating parts are added to the weighing cell compartment 24, such as for example the optional, auxiliary weight display 18 shown in FIG. 2 which uses about 0.2 watt, or an electronic level indicator which uses about 0.1 watt, the power dissipation originating from the weighing cell compartment 24 increases commensurately and can further be variable. As it affects the required level of heat flow $P_{net}$ that needs to be maintained by the heat flow controller 28, the additional power consumption needs to be calculated or measured and provided to the heat flow controller 28 as an additional input.

Figure 4:
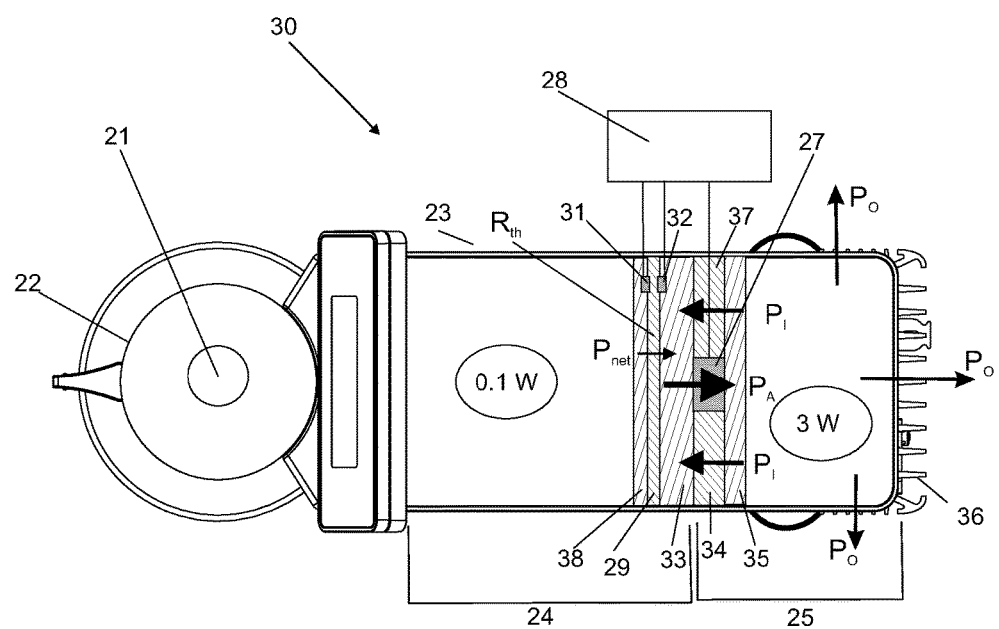
FIG. 4 represents a second embodiment of the invention with active heat flow control between the weighing cell compartment and the electronics compartment.

In contrast to the foregoing embodiment of FIG. 3, where the Peltier module 27 serves both as a heat pump and as an indirect means to determine the heat flow $P_{net}$, the balance 30 in FIG. 4 uses a separate means dedicated only to the determination of the net heat flow $P_{net}$. As illustrated, the heat flow determining means is configured as a pair of temperature sensors 31, 32 placed on opposite sides of a flat boundary layer 29 of insulating material of a known thermal resistance $R_{th}$. The temperature sensors 31, 32 measure, respectively, a first temperature $T_1$ in the third interior wall 38 on the side of the boundary layer 29 that faces towards the weighing cell compartment 24 and a second temperature $T_2$ in the first interior wall 33 on the side of the boundary layer 29 that faces towards the electronics compartment 25. Based on the electrical signals received from the sensors 31, 32, the heat flow controller 28 calculates the heat flow through the boundary layer 29 (which equals the net heat flow $P_{net}=P_A-P_I$) according to the equation:

$$P_{net} = \frac{T_1 - T_2}{R_{th}}.$$

Figure 4A:
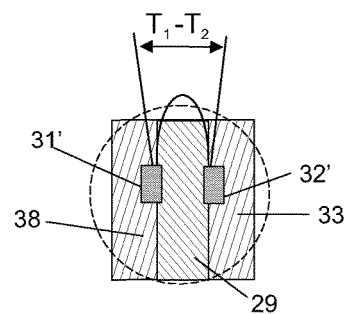
FIG. 4a shows an alternative heat sensor arrangement for the embodiment of FIG. 4.

FIG. 4A shows an alternative to the temperature-sensing arrangement of FIG. 4. The means to determine the heat flow through the boundary layer 29 includes a pair of anti-serially connected thermocouples wherein two thermocouple materials A and B are joined in a sequence A-B-A and the junctions A-B and B-A (shown, respectively, as 31', 32') are placed on opposite sides of the boundary layer 29. Such a thermocouple pair 31', 32' can measure the temperature difference $T_1-T_2$ directly and send a corresponding signal to the heat flow controller 28.

Figure 5:
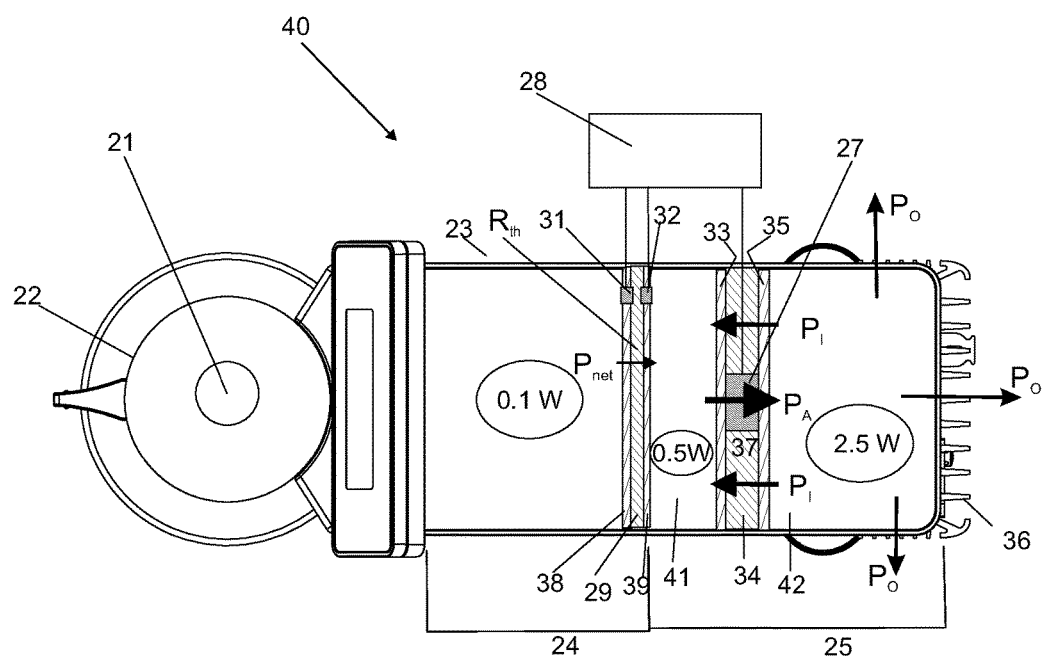
FIG. 5 represents a third embodiment of the invention, wherein the interior of the balance housing is divided into a weighing cell compartment, a weighing electronics chamber, and a digital electronics chamber.

FIG. 5 illustrates a further embodiment of a balance 40 according to the invention, which differs from the balance 20 of FIG. 3 and the balance 30 in FIG. 4 in that the electronics compartment 25, is now divided into a weighing electronics chamber 41 containing temperature-sensitive, primarily analog electronic circuits and a digital electronics chamber 42 containing primarily digital circuits and other power-dissipating elements. The parts of the balance 40 that are identical to those of the balances 20 and 30 are identified by the same reference symbols as in FIGS. 3 and 4.

Within the balance 40 of FIG. 5, the weighing electronics chamber 41 borders on the boundary layer 29 across a fourth interior wall 39, while the opposite side of the weighing electronics chamber 41 is delimited by the first interior wall 33. The digital electronics chamber 42 occupies the end of the balance housing 23 beyond the second interior wall 35. Analogous to the balance 30 of FIG. 4, the heat flow through the boundary layer 29 is the quantity being determined by means of the temperature sensors 31, 32, based on which the heat flow controller 28 regulates the active heat flow $P_A$ generated by the Peltier module 27.

FIG. 5 further illustrates the heat flows occurring in the balance 40 as a result of the dissipation of electrical power into heat. As in the previous examples of FIGS. 3 and 4, the weighing cell inside the weighing cell compartment 24 dissipates typically of the order of 0.1 watt, resulting in a small heat flow from the weighing cell compartment 24 through the boundary layer 29 into the weighing electronics chamber 41. Typically, the primarily analog electronics in the weighing electronics chamber 41 dissipate 0.5 watt, while the circuits inside the digital electronics chamber 42 dissipate 2.5 watt, resulting in commensurately large heat flows $P_O$ to the outside by way of the cooling fins 36 and $P_I$ towards the weighing electronics chamber 41 by way of the insulating material 37 that fills the interstitial space 34 around the heat pump module 27. The heat pump module 27 generates the active heat flow $P_A$ as dictated by the heat flow controller 28 to keep the heat flow $P_{net}$ at the required level.

While the invention has been described through the presentation of several specific embodiments, it is considered self-evident that numerous additional variants could be developed based on the teachings of the present invention, for example by combining the features of the individual embodiments with each other and/or by exchanging individual functional units of the embodiments against each other. For example, the alternative means for determining the heat flow $P_{net}$ as illustrated in FIG. 4A, or the concept of using the Peltier module alternatingly as a heat pump and as a sensing device for a temperature difference $\Delta T_I$ could obviously be applied also to the embodiment of FIG. 5.

What is claimed is:

1. A balance configured as a single unit and comprising:
 a weighing compartment;
 a weighing pan enclosed in the weighing compartment;
 a balance housing, adjoining the weighing compartment and comprising:
  a weighing cell compartment, enclosing a weighing cell;
  an interstitial space, separated from the weighting cell compartment by a first interior wall; and
  an electronics compartment, containing electrical and electronic circuit elements, separated from the interstitial space by a second interior wall;
 a means for determining a net amount of heat flow $P_{net}$ inside the balance housing from the weighing cell compartment in the direction of the electronics compartment and for providing a signal corresponding to the magnitude and direction of the net amount of heat flow;
 a heat flow controller, in the balance housing; arranged to receive the signal as a control input;
 a thermoelectric heat pump module, configured as a Peltier module arranged in the interstitial space with a first side thereof thermally connected to the first interior wall and a second side thereof thermally connected to the second interior wall, the Peltier module operating in a heat pumping mode with the first side removing heat and the second side producing heat to generate an active heat flow $P_A$ with a magnitude and direction to hold the net amount of heat flow $P_{net}$ at a level that essentially equals the rate of heat dissipation produced inside the weighing cell compartment, where the Peltier module is regulated by an electric current driven therethrough from the heat flow controller; and
 insulating material, filling the interstitial space surrounding the Peltier module with an amount of passive heat flow $P_i$ occurring through the insulating material; such that $P_{net}$ is defined by the equation:

$$P_{net}=P_A-P_i.$$

2. The balance of claim 1, wherein:
 the Peltier module serves as the means for determining $P_{net}$ by being temporarily switched from the heat-pumping mode to a thermoelectric generator mode in which:
  when a temperature difference $\Delta T_I$ exists across the insulating material between the first interior wall and the second interior wall, the Peltier module generates a voltage signal $U_{Seebeck}$ according to the relationship $$\Delta T_I = k_2 \times U_{Seebeck}$$

and the heat flow controller receives the voltage signal $U_{Seebeck}$, as the control input and, using the further relationship:

$$Pi = k_1 \Delta T_I = k_1 k_2 U_{Seebeck}$$

determines $P_{net}$.

3. The balance of claim 1, further comprising:
a third interior wall that adjoins the weighing cell compartment;
a boundary layer of insulating material having a thermal resistance $R_{th}$, arranged between the third interior wall and the first interior wall; and
a pair of temperature sensors, placed, respectively, on the third interior wall and on the first interior wall;
such that the pair of temperature sensors serve as the means for determining $P_{net}$ by sending at least one temperature signal as the control input signal to the heat flow controller for calculating the heat flow through the boundary layer, which represents the net heat flow $P_{net}$.

4. The balance of claim 3, wherein:
the first of the pair of temperature sensors measures a temperature $T_1$ of the third interior wall and the second of the pair of temperature sensors measures temperature $T_2$ of the first interior wall, and
each of the temperature sensors sends a temperature signal to the heat flow controller, where the net heat flow $P_{net}$ is calculated according to the equation:

$$P_{net} = \frac{T_1 - T_2}{R_{th}}.$$

5. The balance of claim 3, wherein:
the pair of temperature sensors comprises a pair of thermocouples, connected anti-serially with the junctions placed, respectively, on the third interior wall and on the first interior wall, so that the pair of thermocouples measure a temperature difference in which the temperature of the first interior wall is subtracted from the temperature of the third interior wall, and
the pair of thermocouples send a temperature difference signal $\Delta T$ to the heat flow controller, where the net heat flow $P_{net}$ is measured according to the equation:

$$P_{net} = \frac{\Delta T}{R_{th}}.$$

6. The balance of claim 3, further comprising
a second Peltier module, arranged to operate in the thermoelectric generator mode to do the following steps:
measure a first temperature $T_1$ of the third interior wall and a second temperature $T_2$ of the first interior wall;
generate a temperature difference signal $\Delta T$ with a magnitude and direction determined by subtracting the second temperature from the first temperature; and
send the temperature difference signal $\Delta T$ to the heat flow controller, and
where the heat flow controller calculates the net heat flow $P_{net}$ according to the equation:

$$P_{net} = \frac{\Delta T}{R_{th}}.$$

7. The balance of claim 1, wherein:
the electronics compartment is divided into a weighing electronics chamber for containing temperature-sensitive, primarily analog electronic circuits and a digital electronics chamber for containing primarily digital and power circuits that are less temperature sensitive.

8. The balance of claim 7, further comprising:
a third interior wall, adjoining the weighing cell compartment;
a boundary layer of insulating material having a thermal resistance $R_{th}$; and
a fourth interior wall, such that the boundary layer of insulating material is between the third interior wall and the fourth interior wall and the weighing electronics chamber is located between the fourth interior wall and the first interior wall; and
a pair of temperature sensors, placed on the third interior wall and the fourth interior wall, the pair of temperature sensors operating as the means for determining the net heat flow $P_{net}$ by measuring the respective temperatures and sending at least one temperature signal to the heat flow controller, where the heat flow through the boundary layer is calculated and is used to represent the net heat flow $P_{net}$ out of the weighing cell compartment.

9. The balance of claim 1, further comprising:
additional electronic elements that dissipate heat are incorporated in, or attached to, the weighing cell compartment, such that the rate of heat dissipated by the additional electronic elements is calculated and/or measured and a signal representative thereof is sent as an additional input to the heat flow controller in order to regulate the net heat flow ($P_{net}$) as required to remove the increased amount of heat due to the additional electronic elements;
wherein the additional electronic elements comprise at least one of: an auxiliary display panel and an electronic out-of-level sensing device.

10. The balance of claim 1, further comprising:
cooling fins, arranged on an exterior wall portion of the balance housing, the cooling fins exposed to the ambient atmosphere.

* * * * *